3,211,636
PREPARATION OF MONOCHLORO-
FLUOROALKANES
Peter J. Manno and William H. Snavely, Jr., Ponca City, Okla., assignors to Continental Oil Company, Ponca City, Okla., a corporation of Delaware
No Drawing. Filed Aug. 29, 1962, Ser. No. 220,136
9 Claims. (Cl. 204—163)

This application is a continuation-in-part of co-pending U.S. patent application Serial No. 29,782, filed May 18, 1960, now abandoned.

This invention relates to a method for the preparation of chlorofluoroalkanes and more particularly to the method of preparing such compounds by reacting chlorine with an alkane having at least one fluorine substituent wherein the reaction is induced by nuclear radiation.

The chlorination of fluoroalkanes to produce chlorofluoroalkanes presents certain difficulties. In the past, very mild low temperature chlorination in the presence of ultraviolet radiation has been proposed for the purpose of minimizing side reactions, but long reaction times are required and a good deal of over-chlorinated product is obtained by this procedure. On the other hand, high reaction temperatures and catalysts have been employed so as to obtain good conversion rates within reasonable reaction times, resulting in the production of a number of by-products.

We have now discovered that fluoroalkanes can be reacted with chlorine in the presence of gamma radiation to yield chlorofluoroalkanes with no perceptible by-products, and with efficient utilization of the nuclear radiation.

Accordingly, it is the overall object of the present invention to provide a simple, efficient, and economical non-catalytic process for the chlorination of fluoroalkanes which employs gamma radiation as the reaction-promoting agent. A more specific object is the provision of a novel method of synthesis of 1-chloro-1-fluoroethane, a compound which is readily converted to vinyl fluoride, a useful polymerizable substance.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the foregoing objects and advantages are obtained by a process which may be described briefly as follows: a mixture is prepared comprising chlorine and a fluoroalkane, then the chlorination of the fluoroalkane is initiated by subjecting the mixture to gamma radiation and finally the chlorofluoroalkane so produced is recovered from the reaction mixture.

Before proceeding with specific examples illustrating our invention, it may be well to indicate in general the nature of the materials and conditions required in the process.

So as to minimize undesirable side reactions, the chlorine used should be substantially anhydrous.

Suitable fluoroalkanes are generally those containing up to about 3 carbon atoms, on one of which are attached from 1 to 2 fluorine substituents as well as at least 1 replaceable hydrogen atom. Compounds which can be employed include the mono-, di-, and tri-fluorinated alkanes; the 1,1-fluoroalkanes; and the like. Illustrative of specific compounds which can be employed are difluoromethane, 1-fluoroethane, 1,1,2-trifluoropropane, 1,2-difluoropropane, 2-fluoropropane, and 1,1-difluoroethane. While any of the foregoing compounds and other fluoroalkanes can be used, the preferred fluoroalkanes are fluoroethane, 1,1-difluoroethane, and difluoromethane.

The chlorination of 1,1-difluoroethane is disclosed specifically in said co-pending U.S. patent application Serial No. 29,782. The chlorination of fluoroethane to yield 1-chloro-1-fluoroethane is a new and useful synthesis. This compound has been synthesized in the past by fluorination or hydrofluorination of chloroalkanes and chloroalkenes, as disclosed, for example, in U.S. Patents 2,146,354; 2,452,975; and 2,495,407.

The products which are obtained by the method of this invention contain varying degrees of chlorination, depending on the reaction conditions which are employed. Usually, a mixture of chlorinated fluoro compounds is obtained in the reaction product. Ordinarily, the fluoroalkane is chlorinated at a carbon atom to which a fluorine substituent is attached.

Gamma radiation is utilized for carrying out the invention. The actual reaction conditions employed can vary widely depending on the particular fluoroalkane used and on the properties desired in the final product. Specifically, the radiation dosage can vary over a wide range, usually from about $1 \times 10^4$ to about $1 \times 10^7$ reps, preferably from about $5 \times 10^4$ to about $1 \times 10^6$ reps. Usually, the reaction is carried out at room temperature, however, temperatures varying from as low as $-30°$ C. to as high as $200°$ C. may be used. The reaction pressure may also be varied greatly. In general, depending upon the temperature, pressures from as low as atmospheric to as high as about 1500 p.s.i.g. may be used. Best results are obtained when the pressure and temperature conditions are so chosen that the chlorine remains in the gaseous state. The reaction time can also be varied widely; e.g., from a few minutes to as long as several hours or even days, depending on the particular reactants used and on the experimental conditions employed, such as temperature, pressure, and radiation intensity.

Broadly speaking, the ratio of the reactants used can be varied over a rather wide range of from about 0.1 to 10 moles of chlorine per mole of fluoroalkane. Generally, we prefer to employ an excess of chlorine because excess chlorine is easily removed from the reaction mixture.

In order to disclose the nature of the present invention still more clearly, the following illustrative examples will be given. It is to be understood that the invention is not to be limited to the specific conditions or details set forth in these examples except insofar as such limitations are specified in the appended claims. The abbreviation GLPC refers to gas-liquid partition chromatography.

*Example 1*

A Monel reactor was charged with 4.5 grams of $CH_2F_2$ and degassed at liquid $N_2$ temperature. Then 11.8 grams of C.P. chlorine gas was added and the mixture irradiated for 12 hours at $1 \times 10^5$ reps/hr. of gamma radiation from a $Co^{60}$ source. A GLPC analysis of the irradiated sample showed essentially one gaseous product was formed. This product was identified as monochlorodifluoromethane and corresponds to a product yield of 39.6 percent.

No reaction occurred in the absence of gamma radiation.

*Example 2*

The same procedure as Example 1 was used. The charge was 4.0 grams of $CH_2F_2$ and 8.0 grams of $Cl_2$. After 4 hours the GLPC analysis indicated no dark reaction occurred. The reactor was irradiated for 10 hours at $1 \times 10^4$ reps/hr. using a $Co^{60}$ source. A GLPC analysis of the irradiated sample indicated essentially one gaseous product was formed. This product was identified as monochlorodifluoromethane and corresponded to a product yield of 40.5 percent.

Example 3

A 500-ml monel reactor was charged with 0.5 grams of fluoroethane and degassed at liquid $N_2$ temperature. Next, 0.5 grams of chlorine (C.P.) was added and the mixture was allowed to return to room temperature. GLPC analysis indicated no dark reaction had occurred after 48 hours. Then the reactor was irradiated for 18 hours at $1 \times 10^4$ reps/hr. using a $Co^{60}$ source. The GLPC analysis of the irradiated sample indicated formation of only one product. This was deduced from the appearance of only a single product peak occurring from the chromatography of the reaction products on a 15-foot hexamethylphosphoramide column at room temperature. Mass spectrometric qualitative analysis shows only one product and this product corresponds to a compound with the formula $CH_3CHClF$. Infrared analysis confirms this identification. By way of comparison, chlorination by conventional techniques yields a mixture of products.

Example 4

A stainless steel reactor (180 ml.) was charged with 4 grams of 1,1-difluoroethane. Then 2 grams of chlorine was added and the mixture degassed by freeze-pump technique. The reactor was irradiated from 4 hours at a gamma flux of $1 \times 10^5$ reps/hr. A mass spectrometric analysis indicated 8.1 percent of 1-chloro-1,1-difluoroethane and 91.9 percent of 1,1-difluoroethane. The G value based on the amount of 1,1-difluoroethane consumed is 725. A larger amount of 1-chloro-1,1-difluoroethane is produced by a longer irradiation period.

The compounds made by the method of this invention possess utility as propellants and refrigerants. As chemical intermediates they are useful by virute of the fact that they can be easily converted to polymerizable unsaturated compounds. The most interesting of these products from this standpoint is 1-cholro-1-fluoroethane, which may be converted to vinyl fluoride, a substance which yields polymers with unique physical properties as well as chemical stability. By the process of this invention it is possible to base the manufacture of 1-chloro-1-fluoroethane on 1-fluoroethane, a compound which may be made cheaply and easily from ethylene. This has not been feasible previously because conventional methods of chlorination yield product mixtures which are expensive to separate to obtain pure products. The unique ability of the present process to give almost 100 percent selectivity obviates this difficulty. Although it is true that 100 percent conversion would require a long reaction time, the high selectivity more than compensates for this disadvantage. The preferred method of operation is to employ a short reaction time with resulting lower conversion rate, with recycling of unreacted starting material.

While particular embodiments of the invention have been described, it will be understood, of course, that the invention is not limited thereto, since many modifications may be made, and it is, therefore, contemplated to cover by the appended claims any such modifications as fall within the true spirit and scope of the invention.

What we claim is:

1. A process for the production of a monochlorofluoroalkane by chlorinating a fluoroalkane having from 1 to 3 carbon atoms, to one of which are attached from 1 to 2 fluorine substituents along with at least 1 replaceable hydrogen atom, comprising the steps of reacting the fluoroalkane with from 0.1 to 10 moles of chlorine per mole of fluoroalkane, the reaction being induced by gamma radiation in a dosage varying from $1 \times 10^4$ to $1 \times 10^7$ reps, and recovering the monochlorofluoroalkane so produced.

2. A process as claimed in claim 1, wherein the reaction is carried out at a radiation dosage varying from $5 \times 10^4$ to $1 \times 10^6$ reps.

3. A process as claimed in claim 2, wherein the reaction is carried out at a temperature between $-30°$ C. and $200°$ C. and a pressure varying from atmospheric to 1500 p.s.i.g. and in which the chlorine is maintained in the gaseous state.

4. A process as claimed in claim 3, wherein the fluoroalkane is difluoromethane.

5. A process as claimed in claim 3, wherein the fluoroalkane is fluoroethane.

6. A process as claimed in claim 3, wherein the fluoroalkane is 1,1-difluoroethane.

7. A process as claimed in claim 1, wherein the fluoroalkane is difuoromethane.

8. A process as claimed in claim 1, wherein the fluoroalkane is fluoroethane.

9. A process as claimed in claim 1, wherein the fluoroalkane is 1,1-difluoroethane.

References Cited by the Examiner
UNITED STATES PATENTS

| | | | |
|---|---|---|---|
| 2,572,913 | 10/51 | Calfee et al. | 204—163 |
| 2,970,952 | 2/61 | Kloosterziel | 204—163 |
| 3,004,908 | 10/61 | Haszeldine | 204—163 |

JOHN H. MACK, *Primary Examiner.*